United States Patent [19]

Miyazaki et al.

[11] Patent Number: 5,311,964

[45] Date of Patent: May 17, 1994

[54] APPARATUS FOR CONTROLLING A FRONT WHEEL DRIVING FORCE FOR USE IN AN ALL WHEEL DRIVE ASPHALT FINISHER

[75] Inventors: Yukitaka Miyazaki, Akashi; Shigeru Fujiwara, Kakogawa; Takafumi Fujimoto, Akashi, all of Japan

[73] Assignee: Shin Caterpillar Mitsubishi Ltd., Tokyo, Japan

[21] Appl. No.: 794,030

[22] Filed: Nov. 19, 1991

[30] Foreign Application Priority Data

Nov. 19, 1990 [JP] Japan .............................. 2-120310[U]

[51] Int. Cl.⁵ ..................... B60K 7/00; B60K 17/356
[52] U.S. Cl. .................................... 180/306; 180/308; 180/242; 180/41; 280/43.13; 280/43.18; 280/714
[58] Field of Search .................. 180/39, 41, 306, 308, 180/242; 280/43.13, 43.18, 43.23, 709, 714

[56] References Cited

U.S. PATENT DOCUMENTS

| | | | |
|---|---|---|---|
| 3,693,987 | 9/1972 | Bobard et al. | 280/709 X |
| 4,534,575 | 8/1985 | Grove et al. | 180/41 X |
| 4,836,564 | 6/1989 | Heims | 180/41 X |
| 4,886,285 | 12/1989 | Horbach et al. | 180/41 X |

FOREIGN PATENT DOCUMENTS

2360149  8/1974  Fed. Rep. of Germany ........ 180/41

Primary Examiner—Brian L. Johnson
Attorney, Agent, or Firm—Oblon, Spivak, McClelland, Maier & Neustadt

[57] ABSTRACT

The right and left front wheels of an asphalt finisher are each supported by a beam, one end of which is mounted to the body of the asphalt finisher by way of a pin such that the beam can swing, and the other end of the beam is mounted to the end of the piston rod of a hydraulic cylinder which is vertically mounted to the body of the asphalt finisher in a downward direction, both cylinders being connected to each other by way of a single oil line. As a result, when either one of the front wheels encounters an obstacle, the sideward inclination of the body can be eliminated.

4 Claims, 9 Drawing Sheets

APPARATUS FOR CONTROLLING A FRONT WHEEL DRIVING FORCE FOR USE IN AN ALL WHEEL DRIVE ASPHALT FINISHER

FIELD OF THE INVENTION

The present invention relates to an apparatus for controlling a front wheel driving force for use in an all wheel drive asphalt finisher.

BACKGROUND OF THE INVENTION

Figure 9:
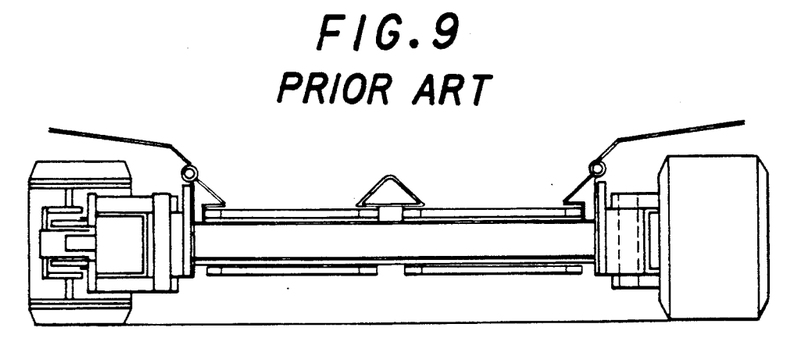
FIG. 9 is a frontal view in cross section illustrating either one of the wheels of the prior art asphalt finisher, in which the wheel is directly mounted to the body.

Conventionally, various ideas have been conceived for increasing the front wheel driving force of an asphalt finisher. A relatively simple method, shown in FIG. 9, is one in which the axles of the front wheels are fixed to both sides of the body of the asphalt finisher, and the distribution of the load on the right and left front wheels while the asphalt finisher is operated on rough ground is ignored. In another method, a flow divider, which corresponds to a non-spin of differential gear or differential gear lock in a mechanically driven system is provided within the front wheel drive hydraulic circuit to prevent a loaded wheel from stopping or a wheel with no load from turning when the load on the wheels is deficient, so as to apply at least some tractive force to the loaded wheels. In addition, there is also a method in which, in order to achieve uniform right and left wheel loads, a swinging beam is disposed at the right and left lower portions of the front hopper so that tractive force can usually be generated by both wheels. In either case, it is necessary to set the driving force so that the driven wheel can maintain traction on the ground surface, assuming that there is no extra weight in the hopper. In the present state of the art, an all wheel drive asphalt finisher has its front and rear wheels driven by means of different oil hydraulic pumps and motors no matter what system is used for synchronizing the speeds of the front and rear wheels, and consequently, full synchronization is difficult to achieve. Therefore, in almost every case, the front wheel is usually rotated faster than the rear wheel so that the rear wheel is constantly pulled by the front wheel. In consequence, the wheels cannot attain maximum traction. The speed difference between the wheel and the ground surface causes slippage between the wheel and ground surface which reduces the tractive force and also damages the ground surface. In addition, although there is one method in which the driving force of the front wheel is controlled, this merely generates a front wheel driving force proportional to the hydraulic pressure force required to drive the rear wheel, which is generated by the entire running resistance (rolling resistance, damping resistance, screeding resistance and climbing resistance) of the asphalt finisher. Still further, in a finisher equipped with the above-described flow divider for preventing a wheel from turning when there is no load on it, the driving force is applied only to wheels which contact the ground surface when the asphalt finisher runs on rough ground, and it is not possible to generate a constantly stable tractive force. Further, even with a finisher equipped with the swinging beam, only a limited tractive force can be usually generated due to changing wheel load.

Further, with a finisher in which the front wheel driving force is controlled, its driving force can be controlled as the running resistance increases and decreases when a sufficient amount of weight is in the hopper, but it is still impossible to generate a driving force proportional to the gripping force of the tire. In addition, if there is not enough weight in the hopper, slippage of tires is likely to occur due to the tractive resistance.

SUMMARY OF THE INVENTION

Accordingly, an object of the present invention is to provide an all wheel drive asphalt finisher in which each of the right and left front wheels is supported by a beam, one end of which is mounted to the body of the asphalt finisher by means of a pin so that the beams may swing, and the other end of the beam is mounted to the end of a piston rod of an oil hydraulic cylinder which is vertically mounted to the body in a downward direction, both the oil hydraulic cylinders being connected to each other by means of a single hydraulic line.

Another object of the present invention is to provide an all wheel drive asphalt finisher in which a pressure sensor is provided to detect the oil pressure within the hydraulic line which feeds back to the hydraulic circuit for driving the hydraulic motor of the front wheel, the hydraulic circuit thereby controlling the hydraulic motor so that it may generate a driving torque corresponding to the oil pressure.

Still another object of the present invention is to provide an all wheel drive asphalt finisher in which the above-described hydraulic circuit includes a variable displacement oil hydraulic pump, a differential pressure remote control valve for controlling a cylinder by controlling a cam plate of the hydraulic pump and a solenoid operated proportional pressure relief valve to allow oil to escape from the differential pressure remote control valve to an oil tank according to pressure signals from the pressure sensor.

A further object of the present invention is to provide an all wheel drive asphalt finisher in which the hydraulic circuit includes a fixed displacement oil hydraulic pump, a three position valve disposed along the oil line between the oil hydraulic pump and the oil hydraulic motor and a solenoid operated proportional pressure relief valve to allow oil to escape which flows from the three position valve into the oil hydraulic motor to an oil tank according to pressure signals from the pressure sensor.

Yet another object of the present invention is to provide an all wheel drive asphalt finisher in which the hydraulic circuit includes a fixed displacement oil hydraulic pump and a solenoid operated proportional pressure reducing valve provided along the oil line between the hydraulic pump and the hydraulic motor for reducing the oil pressure of the oil line according to pressure signals from the pressure sensor.

According to the present invention, by mounting one end of the beam, which supports the front wheel such that it can swing, to the end of the piston rods of the oil hydraulic cylinders, which are connected to each other by means of a hydraulic line, the level of the body of the asphalt finisher can be automatically adjusted so as to eliminate its right- and leftward inclination in order to apply a uniform load to the right and left wheels. In addition, by inputting the load on the front wheel, which is detected at the oil hydraulic cylinder, to the hydraulic circuit of the oil hydraulic motor, the oil hydraulic motor can generate a driving torque corresponding to this load to provide the maximum tractive force without causing the front wheel to slip on the ground surface, even when a load is applied to the front wheel.

BRIEF DESCRIPTION OF THE DRAWINGS

These and other objects as well as advantages of the present invention will become apparent in the following description of a preferred embodiment of the present invention with reference to the accompanying drawings wherein.

DETAILED DESCRIPTION OF THE PREFERRED EMBODIMENT

Figure 1:
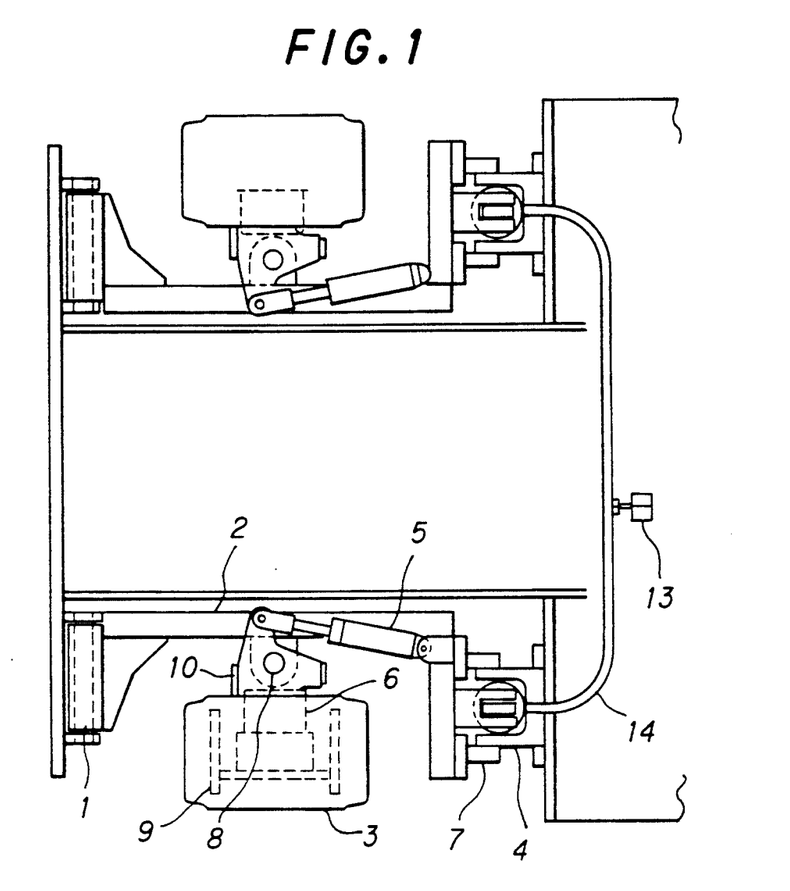
FIG. 1 is a plan view of a front wheel portion of an asphalt finisher according to the present invention.
Figure 2:
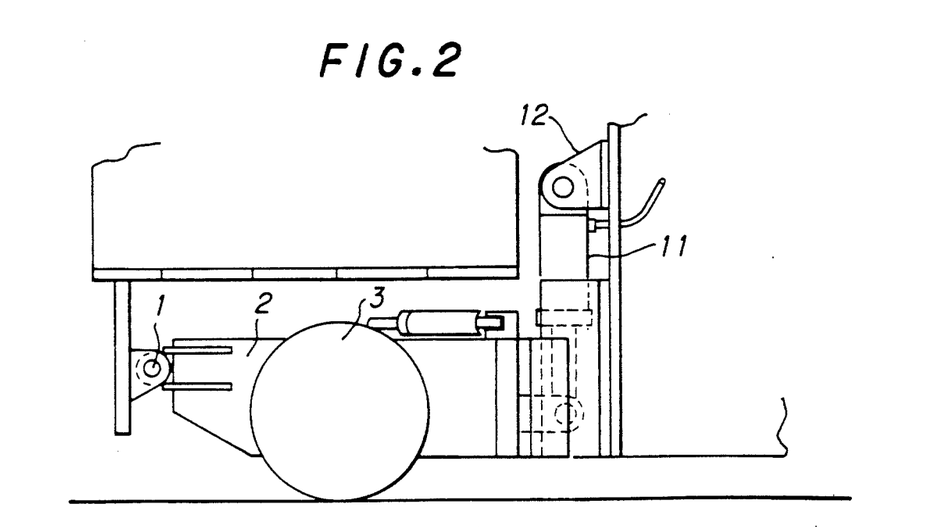
FIG. 2 is a side view of an essential portion of the front wheel portion of the asphalt finisher according to the present invention.

Referring to FIGS. 1 and 2, a beam 2 which supports a front wheel 3 is supported against the body of the asphalt finisher by means of a pin 1 at one end such that it can swing and its other end is fixed to the end of the piston rod of a hydraulic cylinder 11 which serves to automatically adjust the level of the beam 2. When the wheel 3 traverses an uneven ground surface, the beam 2 swings to allow the vertical movement of the wheel 3. The pin 1 is arranged so that it may support the vertical load of the front wheel and the moment caused by the wheel together with the rear slide portion and the oil hydraulic cylinder 11. To the beam 2, a spindle 10, to which a driving motor 6 is fitted, is fixed by means of a steering pin 8 so that, when the asphalt finisher is steered, the front wheel 3 may be rotated in synchronism with a steering cylinder 5 coupled to the arm of the spindle 10. In addition, a hub 9 is fitted to the shaft portion at the end of the spindle via a bearing, and a tire is fixed to the hub 9. At the rear portion of the beam, a slide support 7 is fixed to guide the vertical movement of the beam as the wheel 3 moves vertically and the hydraulic cylinder 11 for automatically adjusting the level is mounted on a bracket below the slide support. Both of the cylinders 11 are connected at their bottom portion by means of a hydraulic line 14 and a pressure sensor 13 is fitted to a port for detecting the pressure, to detect the load applied to the wheel. In addition, a guide bracket 4, which allows the vertical sliding of the slide support 7 behind the beam, is mounted at the body side behind the front wheel portion, and, at the bottom side of the oil hydraulic cylinder 11, a bracket 12 is mounted to guide the vertical movement and to resist the lateral load of the front wheel.

The section below describes the manner in which the same load is applied to both front wheels even when the ground surface is uneven with reference to the arrangement described above As shown in FIG. 3, the horizontal distances from the point where the front wheel 3 contacts the ground to the pin 1 and to the end of the rod of the hydraulic cylinder 11 are referred to as $l_1$ and $l_2$ respectively while the distance from the end of the rod of the hydraulic cylinder 11 up to the point, where the cylinder is mounted, is referred to as L. When $l_1$ and $l_2$ are equal, and the right and left front wheels lie on flat ground, W kg of the dead weight of the front wheel portion is applied to the center of the front wheels 3, and a balanced load of W/2 kg is applied to each front wheel 3. At this time, the load applied to each oil hydraulic cylinder 11 is W/4. Even if the center of the dead weight does not fall exactly midway between the wheels 3, the load is still always uniformly distributed to the right and left front wheels 3. Naturally, even if $l_1$ and $l_2$ are not equal, the load applied to each of the right and left oil hydraulic cylinders 11 is equal.

Figure 3:
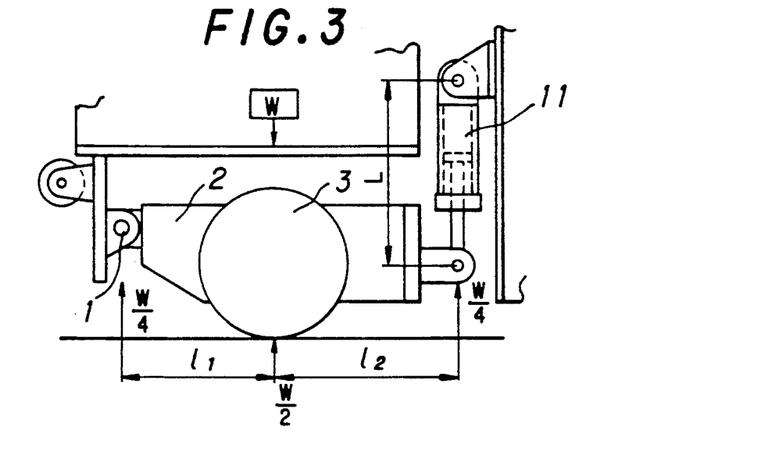
FIG. 3 is a side view illustrating the counterforce from the ground surface, which is applied to one of the front wheels, and the load applied to pins in front of and behind that wheel when, the asphalt finisher runs on a flat ground with the dead weight in the front wheel portion W kg.
Figure 4A:
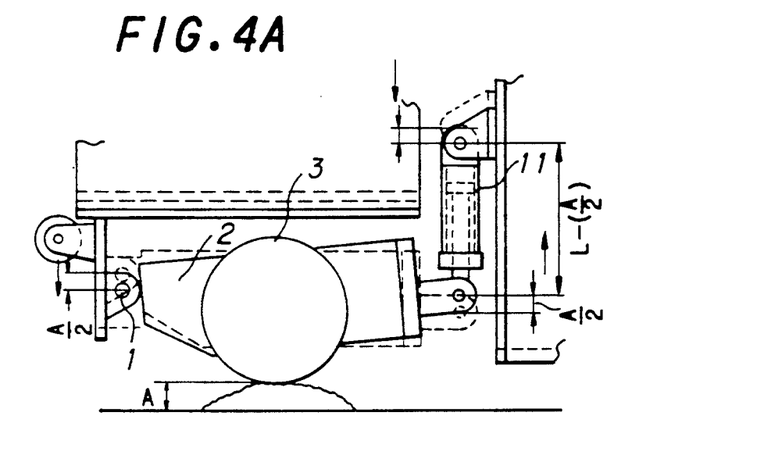
FIGS. 4A and 4B are side views illustrating the condition of each of the front wheel portions when either one of the front wheels runs onto an obstacle of height A when the asphalt finisher is moving on flat ground.
Figure 4B:
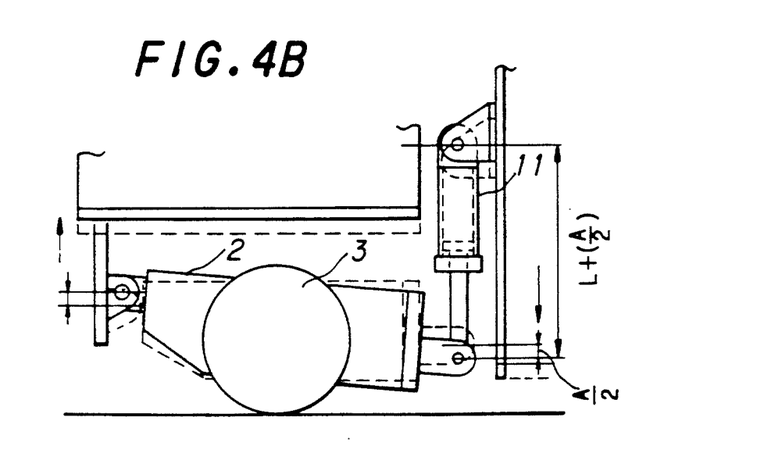

Next, a case in which the asphalt finisher is running on uneven ground and either one of the front wheels 3 goes over an obstacle of height A is described. The beam 2, which supports the front wheel 3 which goes over the obstacle is more forwardly inclined in the downward direction than when the rear end of the beam 2 is fixed (at this time, the distance of L of FIG. 3 is constant as indicated by broken line of FIG. 4A), and the pin 1 is lowered from the position of the broken line by A/2, and the end of the rod of the hydraulic cylinder 11 is raised from the position of the broken line by A/2 (See FIG. 4A). Since the right and left oil hydraulic cylinders 11 are connected to each other by means of a hydraulic line 14, the rod of the hydraulic cylinder 11 of the front wheel 3, which does not run over the obstacle, will extend by the same amount A/2 that the rod of the oil hydraulic cylinder 11 of the front wheel which does go over the obstacle, is retracted. In consequence, the beam 2 which supports the front wheel 3 which does not go over the obstacle, is tilted more forwardly in the upward direction than when it was fixed at its rear end (indicated by the broken line of FIG. 4B), and the pin 1 is raised from the position of the broken line by A/2 while the end of the rod of the oil hydraulic cylinder 11 is lowered from the position of the broken line by A/2 (See FIG. 4B). The height of the pin 1 at the side of the front wheel 3 which goes over the obstacle, from the ground surface is $A-(A/2)=A/2$ while the height of the pin 1 at the side of the front wheel 3 which does not go over the obstacle from the ground surface is $A/2$. That is, even when either one of the front wheels goes over an obstacle, causing a difference in height of the ground surface at which the right and left front wheels contact, a uniform load is always applied to the right and left front wheels 3 because the body always remains horizontal. Even if $l_1$ and $l_2$ are not equal, they differ by only the amount by which the oil hydraulic cylinder 11 is extended or retracted, and the body consequently always remains horizontal and a uniform load is also always applied to the right and left front wheels.

Figure 5:
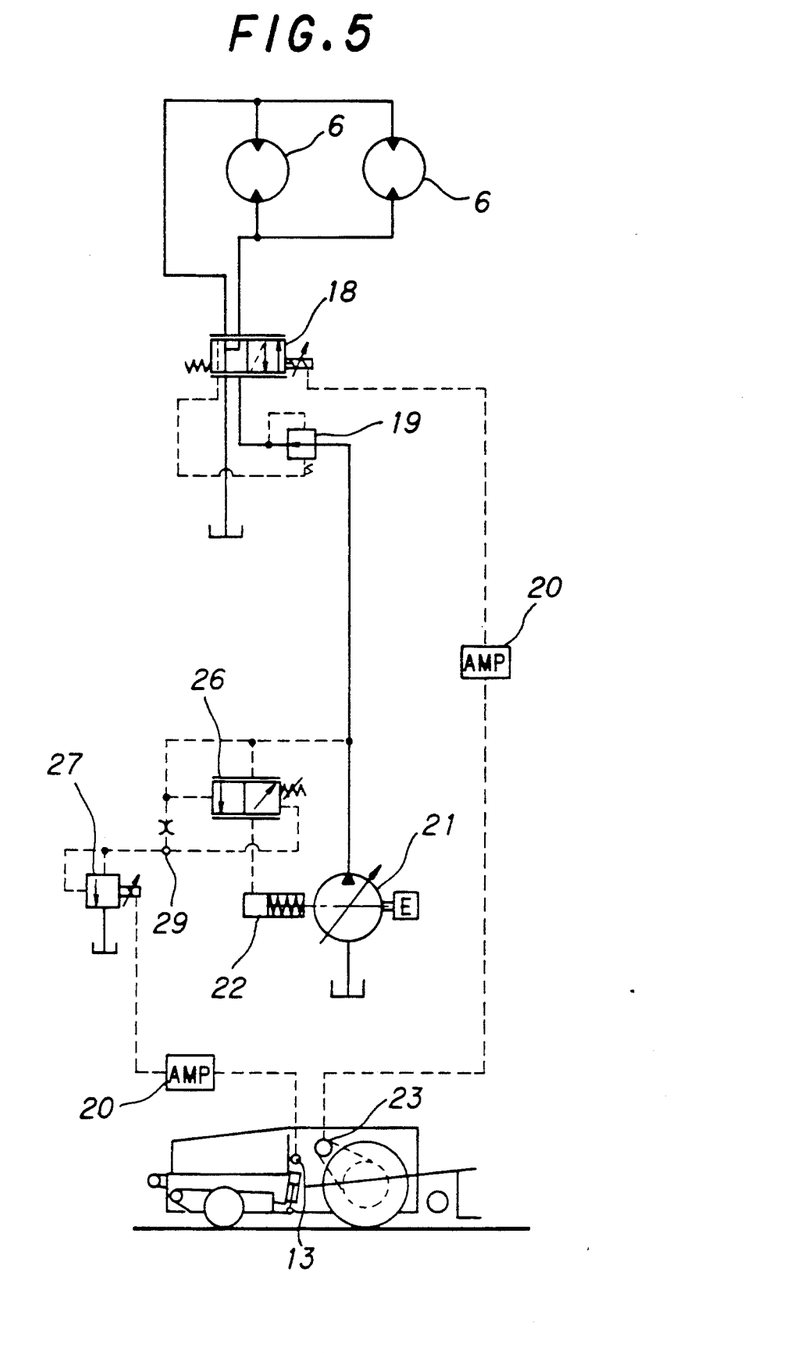
FIG. 5 is a hydraulic circuit diagram of the front wheel driving apparatus of the asphalt finisher according to the present invention.

The following section describes the method by which the driving force of the hydraulic cylinder 6 is controlled with reference to FIG. 5.

The embodiment of FIG. 5 supplies oil pressure generated by a variable displacement oil hydraulic pump 21 to the oil hydraulic motors 6 via a differential pressure control valve 19 and the solenoid operated proportional pressure control valve 18 to drive the oil hydraulic motors 6. A solenoid proportional pressure relief valve 27 and a differential pressure remote control valve 26 are provided at a vent port 29 in order to control a cylinder 22 for controlling the cam plate of the variable displacement oil hydraulic pump 21 as well as to allow oil to escape from the oil line between the variable displacement oil hydraulic pump 21 and the differential control valve 19. The pressure signal from a pressure sensor 13 which is mounted on the hydraulic line 14 connecting both hydraulic cylinders 11, is amplified by an amplifier 20 and input to the solenoid operated proportional pressure relief valve 27 to control the same so that the delivery pressure of the variable displacement oil hydraulic pump 21 will always be proportional to the pressure signal, or, in other words, to the load applied to the front wheel. As a result, the output torque of the oil hydraulic motor 6 will also always be proportional to the load applied to the front wheel. Incidentally, a speed signal from a speed sensor 23 which detects the speed of the rear wheel is inputted via the amplifier to the solenoid operated proportional pressure control valve 18, so that the output torque of the oil hydraulic motors 6 will change according to the speed of the rear wheel.

Figure 6:
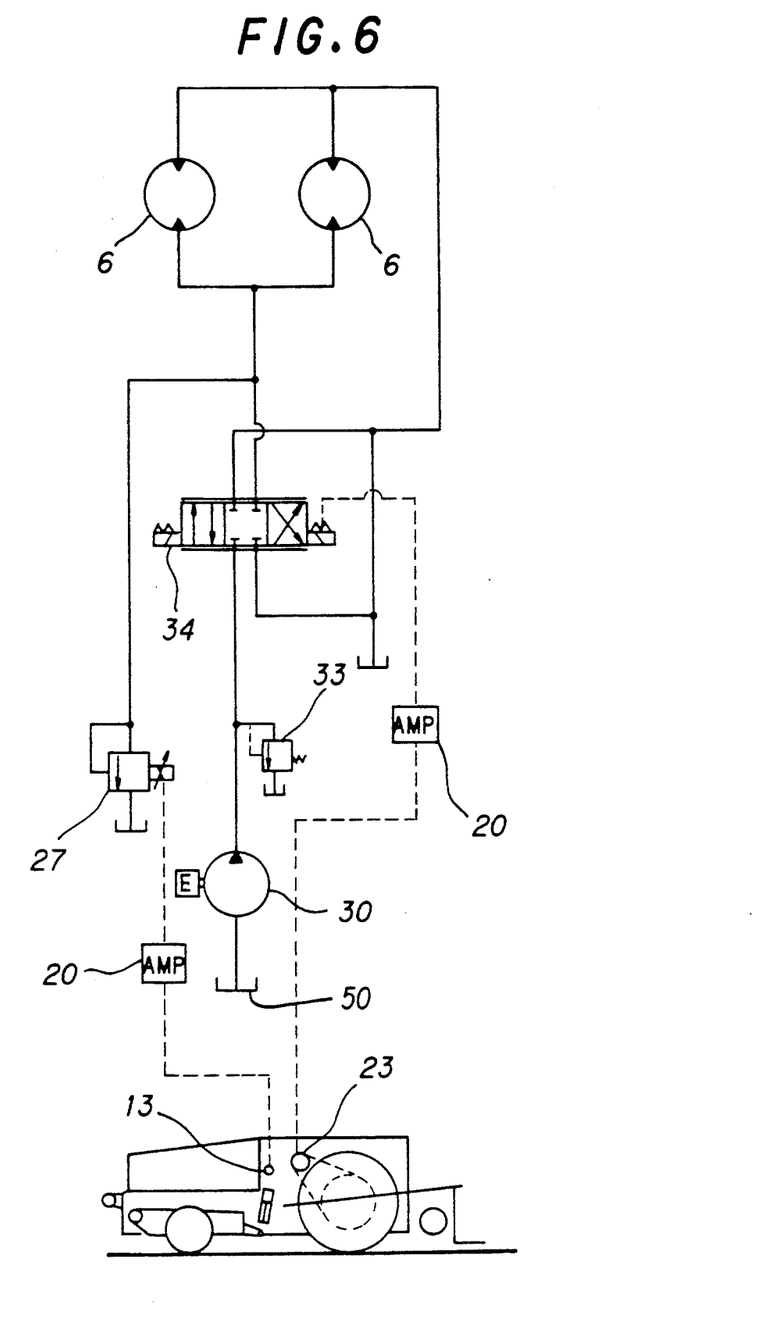
FIGS. 6 and 7 are hydraulic circuit diagrams of another embodiment of the front wheel driving apparatus according to the present invention.

The hydraulic circuit of FIG. 6 is a pressure feedback type in which, in place of the variable displacement oil hydraulic pump 21 of FIG. 5, a fixed displacement oil hydraulic pump 30 is used so that the pressure detected by the pressure sensor 13 is transmitted to the solenoid operated proportional pressure relief valve 27 via the amplifier 20 to allow oil to escape through the oil line between the hydraulic motors 6 and the three position valve 34 according to the above-described pressure. More specifically, the solenoid operated pressure relief valve 27 permits oil flowing through the hydraulic motors 6 from the three position valve 34 to escape into an oil tank 50 according to the pressure signal emitted from the pressure sensor 13. The relief valve 33 serves to allow the oil to escape through the oil line between the oil hydraulic pump 30 and the three position valve 34. In this case, the speed signal from the speed sensor 23 is input to the three position valve 34 via the amplifier 20.

Figure 7:
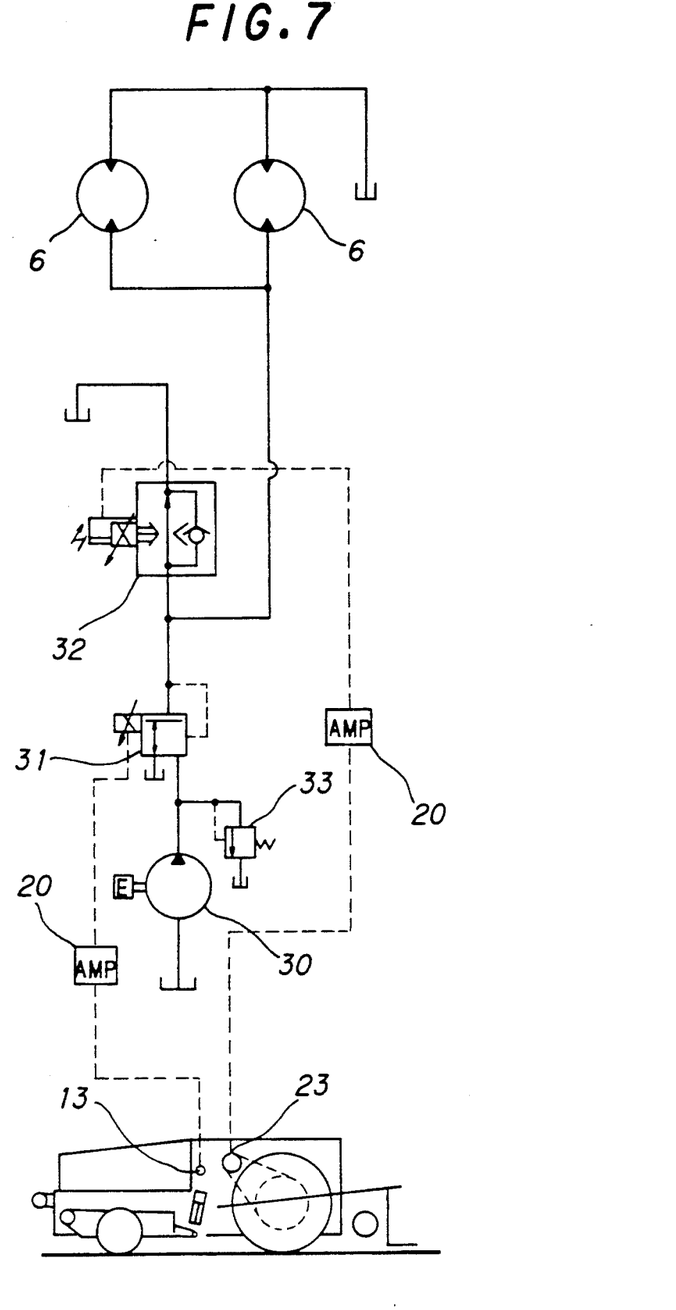

In the hydraulic circuit of FIG. 7, in order to control the pressure, a solenoid operated proportional pressure reducing valve 31 is provided along the oil line between the fixed displacement oil hydraulic pump 30 and the hydraulic motors 6 and, in order to control the speed, a solenoid operated proportional flowrate control valve 32 is provided, to which the speed signal from the speed sensor 23 is input.

This hydraulic circuit may be used as a bleed-off circuit for returning a portion of the oil delivered from the oil hydraulic pump 30 to an oil tank and can effect adjustment of the returned amount to control the speed, and also includes a hydraulic circuit implemented as a meter-in or meter-out circuit for adjusting the flowrate.

Figure 8:
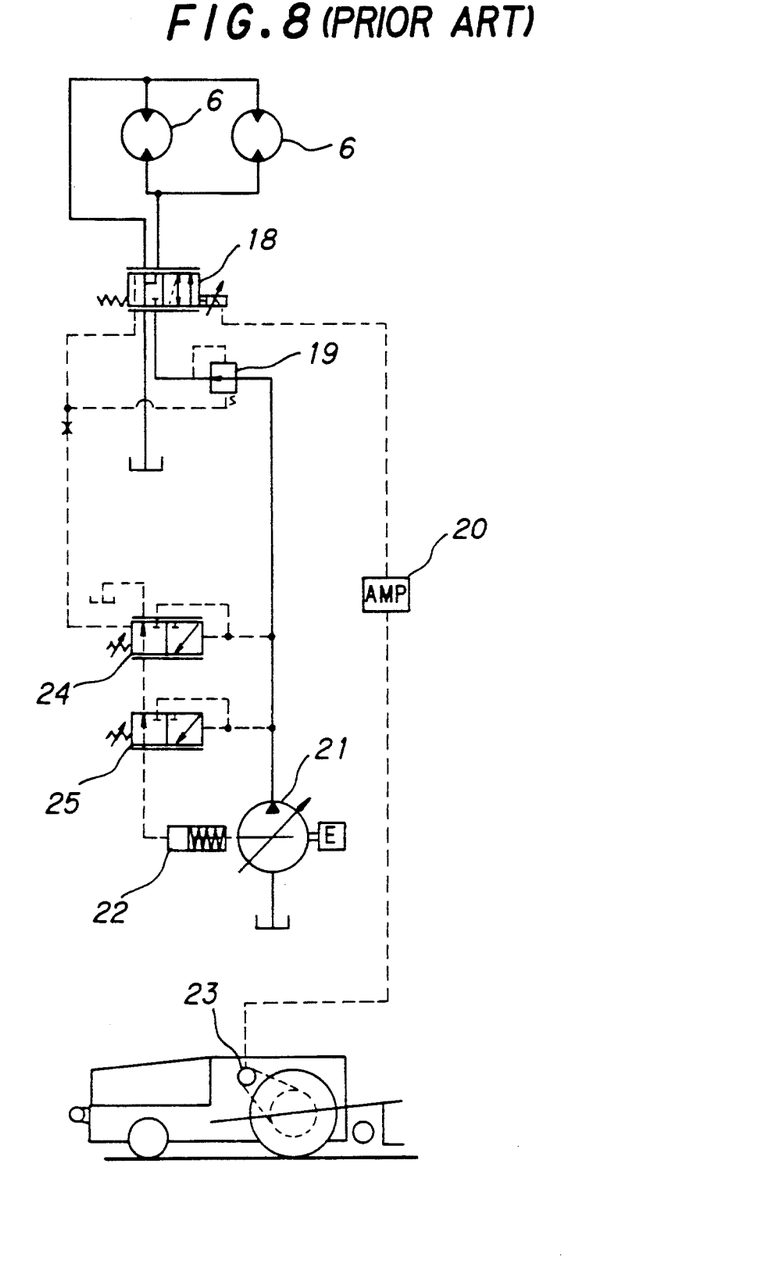
FIG. 8 is a hydraulic circuit diagram of a conventional embodiment of the front wheel driving apparatus of the asphalt finisher.

The hydraulic circuit of FIG. 8 is for the oil hydraulic motors 6 of a conventional asphalt finisher. In this case, the cylinder for controlling the cam plate of the variable displacement oil hydraulic pump 21 is controlled by a differential pressure adjusting valve 24 and a pressure control valve 25.

The scope of the invention also includes the incorporation of the differential pressure adjusting valve 24 of FIG. 8 in addition to the differential remote control valve 26 of FIG. 5.

Figure 11:
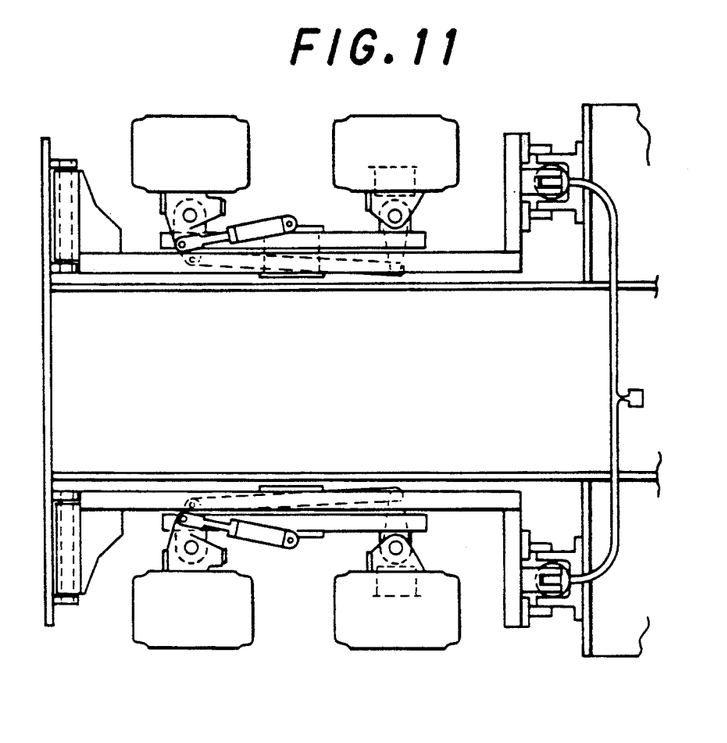
FIG. 11 is a plan view of the front wheel portion of the asphalt finisher in which there are four wheels.
Figure 12:
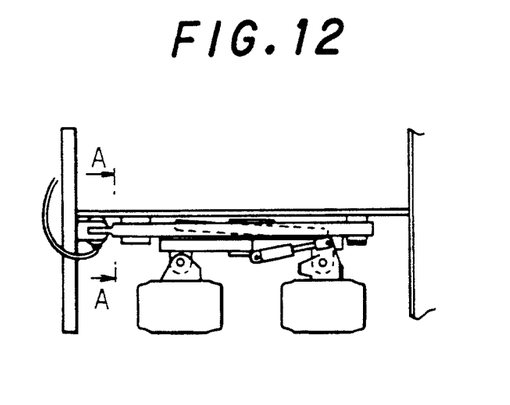
FIG. 12 is a plan view of the front wheel portion of the asphalt finisher illustrating another embodiment of the present invention.
Figure 13:
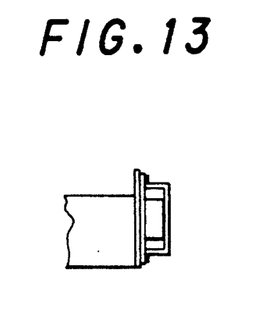
FIG. 13 is a longitudinal cross-sectional view of the front wheel portion taken along line A—A of FIG. 12.
Figure 14:
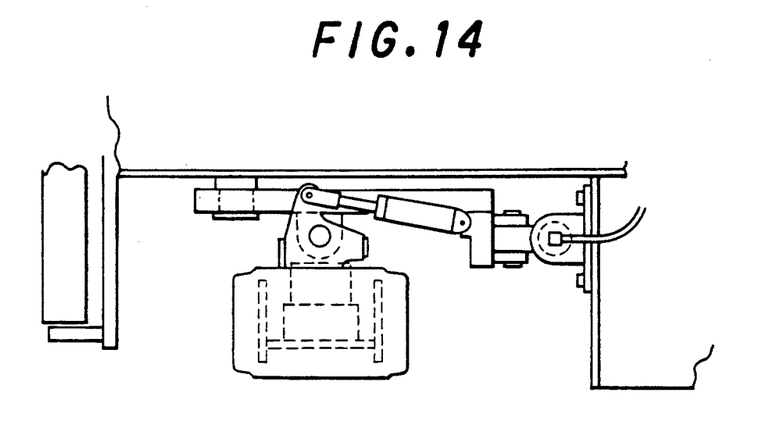
FIG. 14 is a plan view of the front wheel portion of the asphalt finisher illustrating still another embodiment of the present invention.
Figure 15:
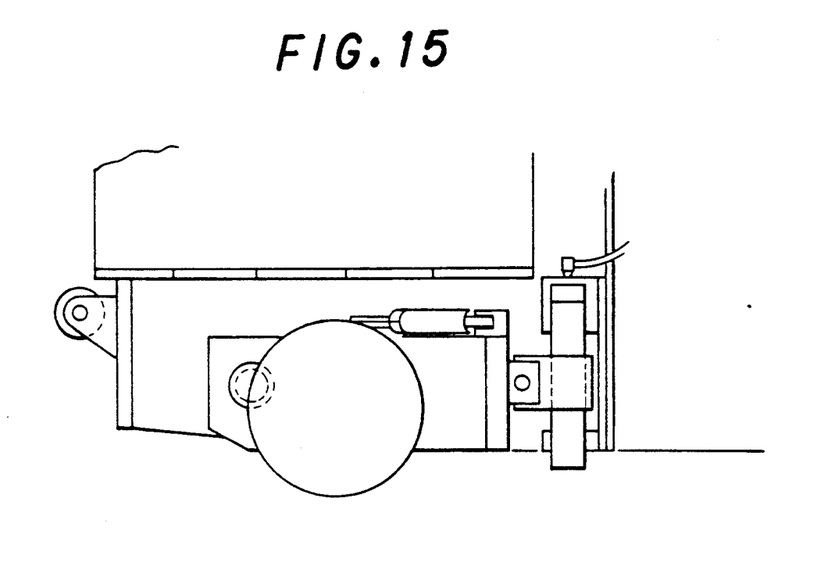
FIG. 15 is a lateral view of the front wheel portion of the embodiment shown in FIG. 14.

In addition, the present invention also includes the arrangement shown in FIG. 11, in which there are four front wheels, the arrangement shown in FIGS. 12 and 13, in which the position and construction of the slide guide or the position of the steering cylinder and the hydraulic cylinder for automatically adjusting the level are changed and the arrangement shown in FIGS. 14 and 15, in which the cylinder for automatically adjusting the level and the slide are integrally formed.

As described above, one end of each of the beams 2 which swingably support the front wheels 3 is mounted to the end of the piston rod of each of the hydraulic cylinders 11, which are connected to each other by means of the hydraulic line 14 to automatically adjust the level of the body of the asphalt finisher by eliminating the sideward inclination so as to allow a uniform load to be applied to the right and left front wheels while the load on each front wheel, which is detected by the hydraulic cylinder 11, is fed back to the hydraulic circuit of the hydraulic motor 6 so that the hydraulic motor may generate a driving torque corresponding to the load on each front wheel with the result that, under any load, the maximum tractive force which allows the front wheel to constantly grip the ground surface can be generated.

Figure 10:
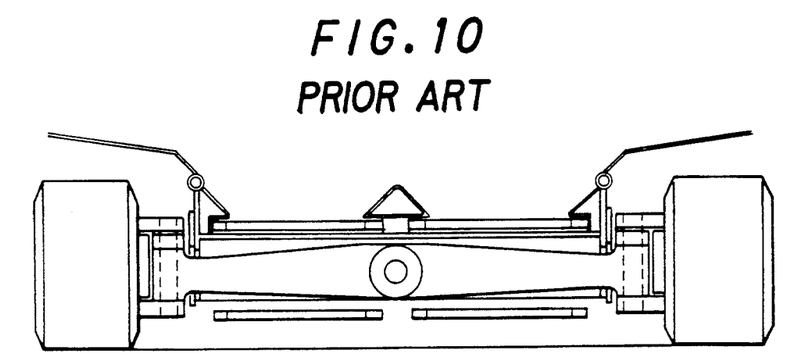
FIG. 10 is a frontal view of the wheel portion of the prior art asphalt finisher in which the wheel is supported against its body by means of a swinging beam.

In addition, according to this embodiment, it is easy to secure space above the return chain and bar compared with the conventional swinging beam system of FIG. 10 in which, since the total weight within the hopper is borne over a large span, the beam must be of considerable size, and since it is necessary to dispose the beam between the chain for conveying the material from the hopper and its return chain, there is not enough space above the ground surface and under the beam required for the return chain and the bar.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An all wheel drive asphalt finisher comprising:
a body;
right and left front wheels, each of said right and left front wheels being supported by a beam;

first and second pins for mounting one end of each of said beams to the body and allowing each of said beams to swing;

first and second hydraulic cylinders each having a piston rod, each of said hydraulic cylinders being vertically mounted on right and left hand sides of said body such that said piston rod extends in a downward direction, the other end of each of said beams being mounted to an end of each of said piston rods;

a first single oil line for connecting said first and second hydraulic cylinders to each other by a common hydraulic pressure, and balancing a level difference of the body in a direction transverse to a direction of movement of said asphalt finisher when the asphalt finisher travels over an uneven surface, such that the right and left front wheels support equal loads;

a hydraulic motor interconnected with each front wheel for driving said front wheels, the hydraulic motor being driving by a hydraulic circuit; and a pressure sensor located within said first oil line for detecting the oil pressure within said first oil line and providing a signal indicative thereof to the hydraulic circuit for driving the hydraulic motor for the front wheels, wherein said hydraulic circuit controls said hydraulic motor to permit said hydraulic motor to generate a driving torque corresponding to sail oil pressure.

2. An all wheel drive asphalt finisher as set forth in claim 1, wherein said hydraulic circuit comprises a variable displacement oil hydraulic pump having a cam plate, a differential pressure remote control valve for controlling a cylinder for controlling said cam plate of said hydraulic pump, and a solenoid operated proportional pressure relief valve interconnected with said differential pressure remote control valve for allowing oil to escape from said differential pressure remote control valve into an oil tank according to a pressure signal emitted from said pressure sensor.

3. An all wheel drive asphalt finisher as set forth in claim 1, wherein said hydraulic circuit comprises a fixed displacement oil hydraulic pump, a three position valve fluidly connected to said hydraulic pump and disposed along a second oil line between said hydraulic pump and said hydraulic motor, and a solenoid operated proportional pressure relief valve position in said hydraulic circuit for allowing oil flowing through said hydraulic motor from said three position valve to escape into an oil tank according to the pressure signal emitted from said pressure sensor.

4. An all wheel drive asphalt finisher as set forth in claim 1, wherein said hydraulic circuit includes a fixed displacement oil hydraulic pump, and a solenoid operated proportional pressure reducing valve disposed along a second oil line between said hydraulic pump and said hydraulic motor for reducing the oil pressure within the second oil line according to the pressure signal emitted from said pressure sensor

* * * * *